(12) United States Patent
Birchak et al.

(10) Patent No.: US 11,572,195 B2
(45) Date of Patent: Feb. 7, 2023

(54) LIGHTNING-DISSIPATIVE AIRCRAFT ASSEMBLIES AND VALVE FRAMES UTILIZED IN THE SAME

(71) Applicant: HONEYWELL INTERNATIONAL INC., Morris Plains, NJ (US)

(72) Inventors: Daniel C. Birchak, Gilbert, AZ (US); John Perek, Phoenix, AZ (US); William F. Ryan, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1231 days.

(21) Appl. No.: 16/046,358

(22) Filed: Jul. 26, 2018

(65) Prior Publication Data
US 2020/0031493 A1    Jan. 30, 2020

(51) Int. Cl.
*B64D 45/02*     (2006.01)
*B64D 13/02*     (2006.01)
(Continued)

(52) U.S. Cl.
CPC ............. *B64D 45/02* (2013.01); *B64D 13/02* (2013.01); *C23C 28/021* (2013.01); *F16K 51/00* (2013.01)

(58) Field of Classification Search
CPC ........... B32B 15/04; B32B 3/12; B32B 15/14; B32B 15/20; B05D 1/36; B05D 3/10;
(Continued)

(56) References Cited

U.S. PATENT DOCUMENTS

| 4,479,163 A | 10/1984 | Bannink, Jr. et al. |
| 4,695,212 A | 9/1987 | Berecz |

(Continued)

FOREIGN PATENT DOCUMENTS

| EP | 2100811 A2 | 9/2009 |
| EP | 2441678 A2 | 4/2012 |
| GB | 2528932 A | 2/2016 |

OTHER PUBLICATIONS

USPTO Office Action for U.S. Appl. No. 15/150,506 dated Sep. 25, 2018.

(Continued)

*Primary Examiner* — Danny Nguyen
(74) *Attorney, Agent, or Firm* — Lorenz & Kopf, LLP

(57) ABSTRACT

Lightning-dissipative A/C assemblies are provided, as are valve frames utilized within lightning-dissipative A/C assemblies. In embodiments, the lightning-dissipative A/C assembly includes a base dielectric component having a mount interface, a strike-susceptible metallic component coupled to the base dielectric component, and mounting hardware configured to engage the mount interface to attach the base dielectric component to an A/C. An electrically-conductive coating overlies or is formed over at least a portion of the base dielectric component to complete a lightning strike dissipation path. The lightning strike dissipation path extends from the strike-susceptible metallic component, through the electrically-conductive coating, through the mounting hardware, and to an A/C electrical ground plane when the lightning-dissipative A/C assembly is installed on the A/C. In one implementation, the base dielectric component assumes the form of a valve frame, while the strike-susceptible metallic component assumes the form of a valve door movably mounted to the valve frame.

18 Claims, 6 Drawing Sheets

(51) Int. Cl.
*C23C 28/02* (2006.01)
*F16K 51/00* (2006.01)

(58) Field of Classification Search
CPC ........... C23C 16/00; C23C 4/08; C23C 28/02;
C23C 28/021; F05F 3/00; H02G 13/00;
B64D 45/02; B64D 13/02; B64C 1/12;
F16K 51/00
USPC ........................................................ 361/218
See application file for complete search history.

(56) References Cited

U.S. PATENT DOCUMENTS

| | | | |
|---|---|---|---|
| 4,755,904 A | 7/1988 | Brick | |
| 5,845,872 A | 12/1998 | Pridham et al. | |
| 7,114,900 B2 | 10/2006 | Toosky | |
| 8,443,575 B1* | 5/2013 | Tanner | B64C 1/1446 |
| | | | 244/129.4 |
| 9,016,615 B2 | 4/2015 | Granado Macarrilla et al. | |
| 2002/0176739 A1 | 11/2002 | Goto et al. | |
| 2005/0280032 A1 | 12/2005 | Hutter, III | |
| 2009/0092844 A1* | 4/2009 | Ware | B64D 45/02 |
| | | | 427/404 |
| 2012/0019973 A1 | 1/2012 | Ehrmantraut et al. | |
| 2013/0048331 A1* | 2/2013 | Fornes | B64D 45/02 |
| | | | 174/2 |
| 2014/0064873 A1 | 3/2014 | Kevin et al. | |
| 2014/0134936 A1 | 5/2014 | Horner et al. | |
| 2016/0016673 A1 | 1/2016 | Anderson et al. | |
| 2017/0217604 A1 | 8/2017 | Birchak et al. | |
| 2018/0195407 A1 | 7/2018 | Kudrna et al. | |

OTHER PUBLICATIONS

Extended EP Search Report for Application No. 17151535.6-1754 dated May 9, 2017.

* cited by examiner

LIGHTNING-DISSIPATIVE AIRCRAFT ASSEMBLIES AND VALVE FRAMES UTILIZED IN THE SAME

TECHNICAL FIELD

The following disclosure relates generally to aircraft systems and, more particularly, to lightning-dissipative aircraft assemblies, as well as to valve frames contained in lightning-dissipative aircraft assemblies.

Abbreviations

Abbreviations appearing relatively infrequently in this document are defined upon initial usage, while abbreviations appearing more frequently in this document are defined below.
A/C—aircraft;
OFV—outflow valve; and
PEEK—polyether ether ketone

BACKGROUND

Certain A/C components, which have traditionally been fabricated from metallic materials, have more recently been reengineered for production from non-metallic materials. For example, in applications in which an A/C component requires high thermal tolerances, but is subject to relatively limited loading demands, the A/C component may be fabricated from an engineered ceramic material as opposed to a metallic material. Certain components located in the A/C engines, such as shrouds and duct members, are thus now produced from such ceramic materials. Similarly, A/C components traditionally fabricated from metallic materials, but not subject to either aggressive thermal demands or loading requirements, may be a candidate for production from a moldable dielectric material, such as PEEK or another thermoplastic. Further, the properties of such thermoplastics can be enhanced through loading with fillers, such as carbon fibers added for increased strength. The redesign of A/C components for production from moldable dielectric materials, when operating requirements permit, can result in significant weight and cost savings in many instances.

BRIEF SUMMARY

Lightning-dissipative A/C assemblies are provided for installation on A/C containing electrical ground planes. In various embodiments, the lightning-dissipative A/C assembly includes a base dielectric component, a strike-susceptible metallic component coupled to the base dielectric component, and an electrically-conductive coating formed on one or more surfaces of the base dielectric component. A lightning strike dissipation path extends from the strike-susceptible metallic component, through the electrically-conductive coating, and to the A/C electrical ground plane when the lightning-dissipative A/C assembly is installed on the A/C. In certain embodiments in which the base dielectric component includes a mount interface, the lightning-dissipative A/C assembly may further contain mounting hardware configured to engage the mount interface to attach the base dielectric component to the A/C, with the lightning strike dissipation path further extending through the mounting hardware. The strike-susceptible metallic component may assume the form of a valve door composed of a metallic material in implementations, while the base dielectric component assumes the form of a valve frame to which the valve door is movably mounted.

In further embodiments, the lightning-dissipative A/C assembly includes a valve frame, an electrically-conductive coating formed on one or more surfaces of the valve frame, and a valve door movably coupled to the valve frame. The valve frame is at least predominately composed of a dielectric material, by weight; e.g., in an embodiment, the valve frame may be predominately composed of a molded thermoplastic material, by weight. Comparatively, the valve door is at least predominately composed of an electrically-conductive material, such as aluminum, by weight. The valve door is electrically coupled to the mounting hardware through the electrically-conductive coating when the lightning-dissipative A/C assembly is installed on an A/C. In some implementations, the valve frame is composed of a majority of a molded thermoplastic material, such as PEEK, by weight; and further contains fibers, such as carbon fibers, distributed through the valve frame and exposed at outer surfaces thereof. The electrically-conductive coating contacts and surrounds portions of the fiber exposed at the outer surfaces of the valve frame. In other implementations in which the valve frame has a cumulative external surface area of $SA_{TOTAL}$, the electrically-conductive coating may be formed to cover greater than 10% and less than 90% of $SA_{TOTAL}$.

Valve frames of the type utilized in A/C valve assemblies, such as cabin OFV assemblies and cabin pressure valve assemblies, are further provided. Embodiments of the valve frame may be utilized in conjunction with a grounding strap and mounting hardware. In various implementations, the valve frame includes an annular frame body through which a central opening is provided, a cable attachment point provided on the annular frame body to which the grounding strap attaches, and a peripheral flange extending around the annular frame body, and an electrically-conductive coating formed on the annular frame body and the peripheral flange. The peripheral flange has a mounting interface engaged by the mounting hardware to attach the valve frame to an A/C. The annular frame body and the peripheral flange are predominately composed of a dielectric material, such as a molded thermoplastic, by weight. The electrically-conductive coating extends from the cable attachment point to the mount interface to eclectically connect the grounding strap to the mounting hardware when the valve frame is attached to the A/C.

Various additional examples, aspects, and other useful features of embodiments of the present disclosure will also become apparent to one of ordinary skill in the relevant industry given the additional description provided below.

BRIEF DESCRIPTION OF THE DRAWINGS

At least one example of the present invention will hereinafter be described in conjunction with the following figures, wherein like numerals denote like elements, and.

Figure 1:
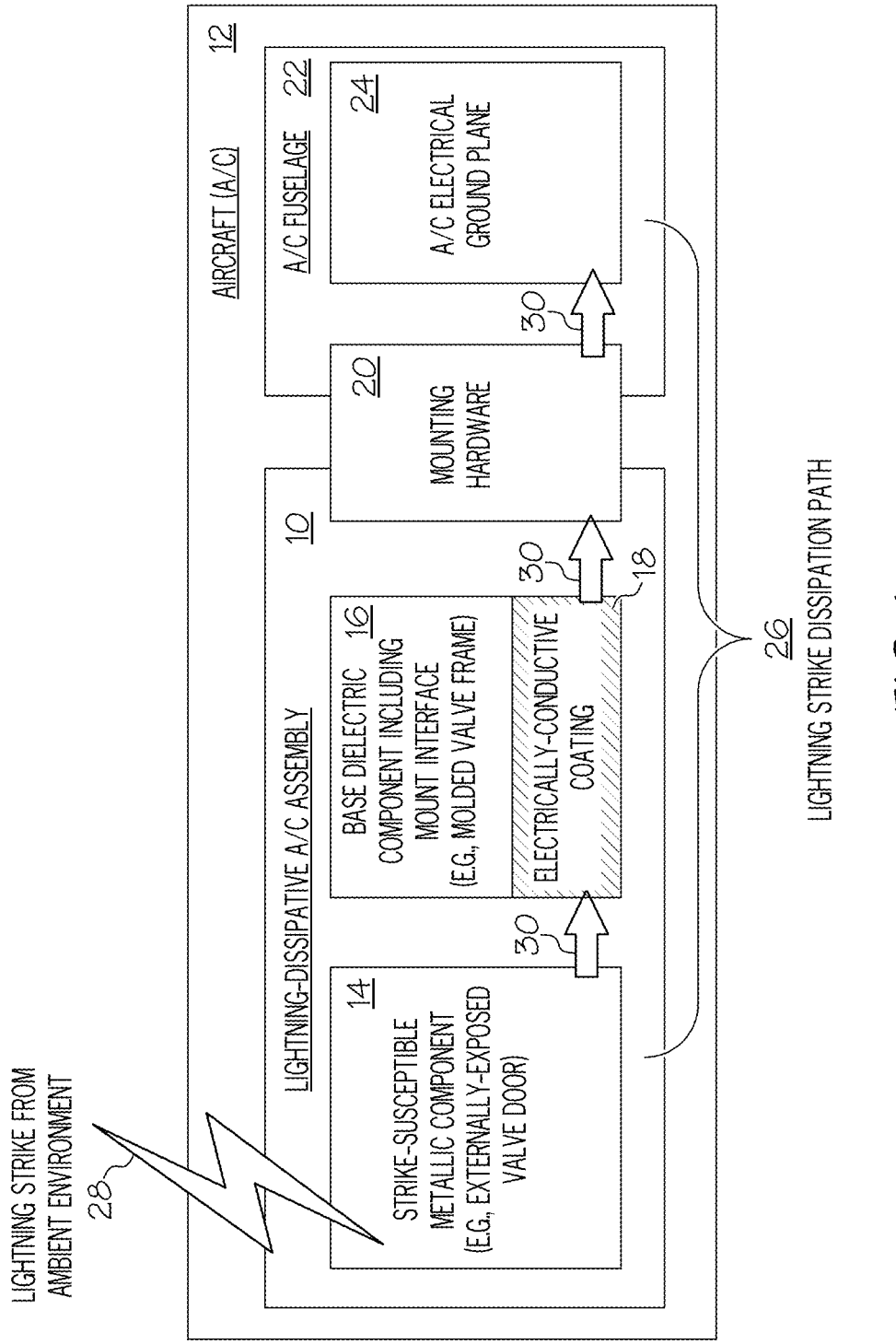
FIG. 1 is a schematic illustrating a lightning-dissipative A/C assembly deployed onboard an A/C including an A/C electrical ground plane, as illustrated in accordance with a generalized embodiment of the present disclosure.

For simplicity and clarity of illustration, descriptions and details of well-known features and techniques may be omitted to avoid unnecessarily obscuring the exemplary and non-limiting embodiments of the invention described in the subsequent Detailed Description. It should further be understood that features or elements appearing in the accompanying figures are not necessarily drawn to scale unless otherwise stated.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

Definitions

The following definitions apply throughout this document. Those terms not expressly defined here or elsewhere in this document are assigned their ordinary meaning in the relevant technical field.

Aircraft (A/C) electrical ground plane—any electrically-conductive structure, regardless of shape, deployed onboard an A/C and providing grounding of electrical current for a plurality of AC components or systems. By common example, an A/C electrical ground plane can assume the form of a metallic (e.g., copper) mesh or expanded weave embedded in the A/C fuselage.

Externally-exposed aircraft (A/C) valve assembly—a valve assembly containing at least one component, such as a valve element, exposed from the exterior of an A/C and susceptible to lighting strike.

Strike-susceptible metallic component—any component or structure utilized onboard an A/C that is (i) at least predominately composed of metallic constituents, by weight, and (ii) exposed to the ambient environment from the exterior of the A/C when installed thereon.

OVERVIEW

As indicated above, cost and weight savings may be achieved through the redesign of certain A/C components, which are traditionally fabricated from metallic materials, for production from lightweight, moldable dielectric materials. Such moldable dielectric materials include PEEK and other thermoplastics, which can be loaded with fillers (e.g., carbon fiber) to yield composites having increased strength and other enhanced properties. A technical challenge arises, however, when attempting to fabricate an A/C component from a moldable dielectric material (or a dielectric material, generally) when the A/C component supports an electrically-conductive (e.g., metal) component exposed from the A/C exterior and susceptible to lightning strike. If an adequate dissipation path is not provided across the dielectric component for rapid conduction of lightning energy, electric arcing can occur and may severely damage the dielectric component, as well as adjacent A/C components, should lightning strike the strike-susceptible component. For example, testing has demonstrated that the base dielectric component can shatter or, indeed, explode if lightning should strike the electrically-conductive component and an adequate electrical dissipation path is not provided across the base dielectric component and to the A/C electrical ground plane.

The following provide lightning-dissipative A/C assemblies containing strike-susceptible metallic components coupled to base dielectric components, which are, in turn, attached to the A/C fuselage or otherwise mounted to the A/C and exposed to the ambient environment. Among other unique characteristics, the lightning-dissipative A/C assemblies feature electrically-conductive coatings, which are formed over surfaces of the base dielectric components. The electrically-conductive coating helps complete a dedicated lightning strike dissipation path for rapidly conducting lightning energy from the strike-susceptible metallic component to the A/C ground plane should lightning strike the metallic component. The electrically-conductive coating may not fully encapsulate the base dielectric component, but rather may be formed on selected surfaces thereof to preserve the flexibility of the base dielectric component, to save cost, or for other reasons. The particular form assumed by the lightning-dissipative A/C assembly will vary amongst embodiments; however, the lightning-dissipative A/C assembly usefully assumes the form of an externally-exposed A/C valve assembly, such as a cabin OFV assembly, in embodiments. Further description of an embodiment in which the lightning-dissipative A/C assembly assumes the form of a cabin OFV assembly is set-forth below in conjunction with FIGS. 2-5. First, however, a generalized embodiment of the lightning-dissipative A/C assembly is described below in conjunction with FIG. 1.

FIG. 1 is a schematic illustrating a lightning-dissipative A/C assembly 10 deployed onboard an A/C 12 and depicted in accordance with a generalized embodiment of the present disclosure. As shown in FIG. 1, lightning-dissipative A/C assembly 10 contains a strike-susceptible metallic component 14 and a base dielectric component 16 having a non-illustrated mount interface. Base dielectric component 16 may be composed of a molded thermoplastic material, such as PEEK, in certain implementations. Further, if desired, the molded thermoplastic material can contain fillers for enhanced properties, such as carbon fibers added for increased strength. In other embodiments, the molded thermoplastic material may not contain fillers; or base dielectric component 16 may be composed of a different dielectric material including compression molded dielectric lay-ups and non-molded dielectric materials, such as machined ceramics and additively-manufactured (e.g., three dimensionally printed) dielectric materials.

An electrically-conductive coating 18 is formed over one or more surfaces of base dielectric component 16. Electrically-conductive coating 18 ideally possesses a relatively high electrical conductivity, while adhering well to underlying dielectric component 16 to decrease the likelihood of coating delamination and spall. Additionally, electrically-conductive coating 18 may be formulated to resist galvanic corrosion and other forms of environment degradation, as appropriate. Electrically-conductive coating 18 can assume the form of a single layer coating in embodiments or, instead, may be realized as a multilayer coating system. For example, in certain implementations, electrically-conductive coating 18 may contain a bond coat layer for enhanced adhesion with dielectric component 16, an electric conduit layer formed over the bond coat layer for enhanced electrical conductivity, and possibly a top coat layer to provide increased environment barrier protection. Examples of coatings suitable for usage as electrically-conductive coating 18 are further discussed below in conjunction with FIG. 6.

Mounting hardware 20 attaches lightning-dissipative A/C assembly 10 to A/C fuselage 22. Mounting hardware 20 further electrically couples lightning-dissipative A/C assembly 10 and, specifically, electrically-conductive coating 18 to an electrical ground plane 24 contained in or otherwise coupled to A/C fuselage 22. In so doing, electrically-conductive coating 18 and mounting hardware 20 help complete a lighting strike dissipation path 26 extending from strike-susceptible metallic component 14, through electrically-conductive coating 18, through mounting hardware 20, and to A/C electrical ground plane 24. In the unlikely event of lighting strike impingement 28 on strike-susceptible metallic component 14, the lightning energy can be rapidly dissipated to A/C electrical ground plane 24 without damage to base dielectric component 16 and the other components of lightning-dissipative A/C assembly 10. Arrows 30 shown in FIG. 1 further indicate the manner in which the electrical energy delivered by such a lightning strike may be directed from metallic component 14, through electrically-conductive coating 18, through mounting hardware 20, and to A/C electrical ground plane 24.

Depending upon the particular form assumed by lightning-dissipative A/C assembly 10, lightning strike dissipation path 26 may also extend through other components contained in A/C assembly 10, as well. For example, in embodiments in which lightning-dissipative A/C assembly 10 assumes the form of an externally-exposed A/C valve assembly, such as a cabin OFV assembly, lightning strike dissipation path 26 may further extend through one or more flexible grounding straps or straps contained in the A/C valve assembly. Further description of one manner in which lightning-dissipative A/C assembly 10 can be implemented as a cabin OFV assembly will now be provided in conjunction with FIGS. 2-5. It is emphasized that the following description is provided by way of non-limiting example only and that further embodiments of lightning-dissipative A/C assembly 10 can assume other forms, providing that A/C assembly 10 includes at least one base dielectric component 16, at least one strike-susceptible metallic component 14 supported by or coupled to base dielectric component 16, and an electrically-conductive coating 18 formed over base dielectric component 16 to serve as electrical bridge allowing conduction of lightning strike energy from strike-susceptible metallic component 14, across base dielectric component 16, and ultimately to electrical ground plane 24.

Exemplary Embodiment of the Lightning-Dissipative A/C Assembly

Figure 2:
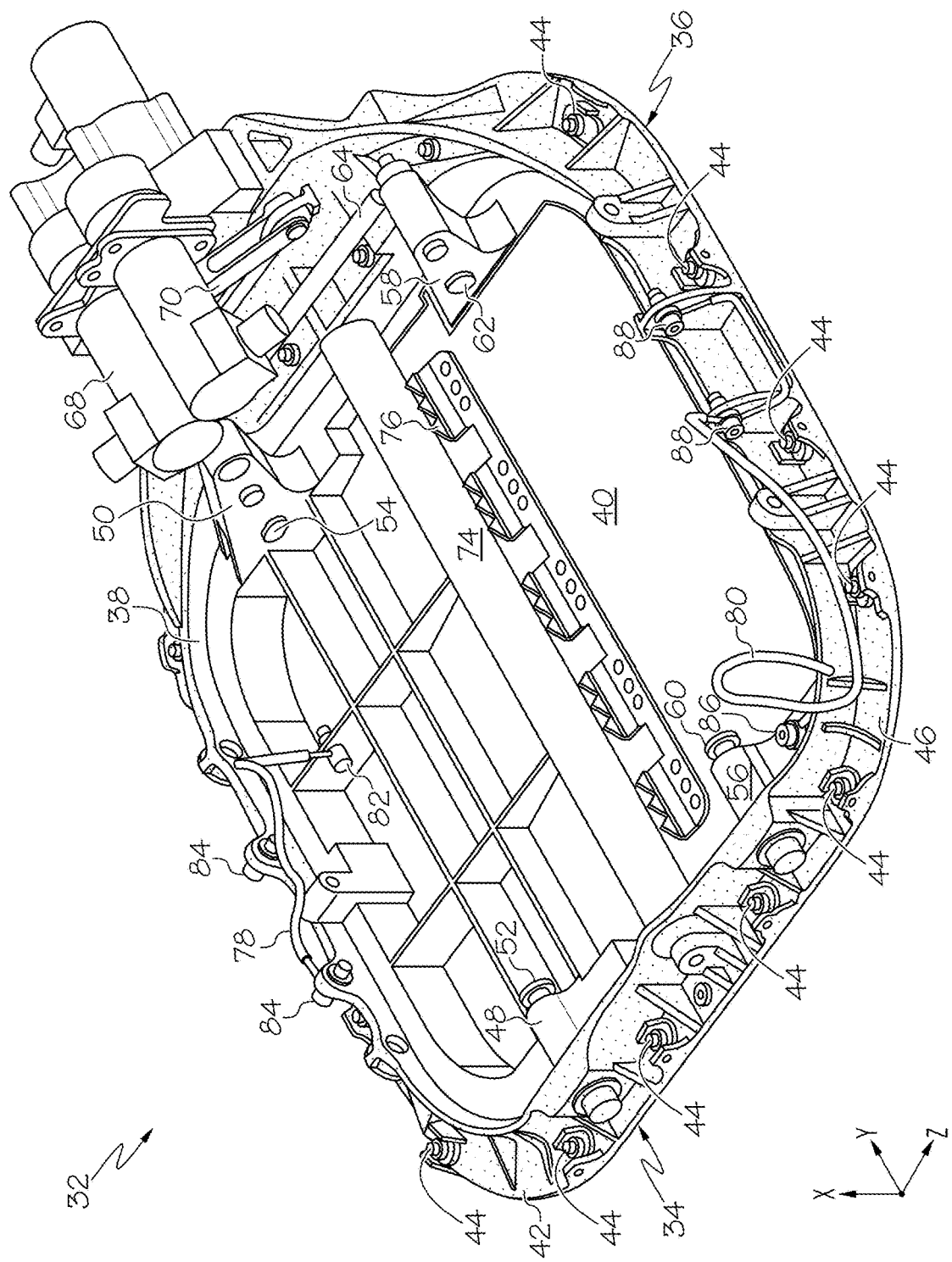
FIG. 2 is an isometric view of a cabin OFV, a valve actuator, and mounting hardware contained in an exemplary implementation of the generalized lightning-dissipative A/C assembly shown in FIG. 1.

FIG. 2 is an isometric view of a lightning-dissipative A/C assembly 32, which is illustrated in accordance with an exemplary embodiment of the present disclosure. In this example, lightning-dissipative A/C assembly 32 assumes the form of a cabin OFV assembly 32 and will consequently be referred to hereafter as "cabin OFV assembly 32." Cabin OFV assembly 32 corresponds to lightning-dissipative A/C assembly 10 discussed above in connection with FIG. 1. In this regard, cabin OFV assembly 32 includes an OFV 34 containing a valve frame 36, which corresponds to base dielectric component 16 in FIG. 1; and two valve doors 38, 40, either or both of which correspond to strike-susceptible metallic component 14 shown in FIG. 1. An electrically-conductive coating 42 (represented by dot stippling in FIG. 2) is formed over selected surfaces of valve frame 36 and, thus, corresponds to coating 18 shown in FIG. 1. Finally, cabin OFV assembly 32 further includes mounting hardware 44 corresponding to mounting hardware 20 shown in FIG. 1. Mounting hardware 44 engages a mount interface of valve frame 36 (here, a peripheral flange 46 having fastener openings therein) to attach valve frame 36 and, therefore, valve doors 38, 40 to an A/C fuselage, such as A/C fuselage 22 shown in FIG. 1.

In the illustrated example, valve doors 38, 40 assume the form of butterfly plates having generally rectangular form factors. In other embodiments, valve doors 38, 40 may assume other forms suitable for regulating airflow through OFV 34 as doors 38, 40 are moved through a range of rotational positions. OFV 34 may also contain a different number of valve doors in alternative embodiments. Valve doors 38, 40 are pivotally mounted to different portions of valve frame 36. Specifically, valve door 38 includes first and second arms 48, 50, which are rotationally joined to valve frame 36 at pivot couplings 52, 54, respectively. Similarly, valve door 40 likewise includes first and second arms 56, 58, which are rotationally joined to valve frame 36 at pivot couplings 60, 62, respectively. A slave link 64 mechanically links arm 50 of valve door 38 to arm 58 of valve door 40. The combination of arms 50, 58 and slave link 64 form a linkage, which ensures that valve doors 38, 40 simultaneously rotate between the closed and open positions. During A/C flight, valve doors 38, 40 are often maintained in slightly opened position referred to as a "cruise" position to allow venting of pressurized air from the fuselage to the ambient environment.

Cabin OFV assembly 32 further includes a side-mounted actuator 68 in the form of twin electrical drive motors mounted to an outer peripheral portion of valve frame 36. A master linkage 70, such as bell crank linkage, mechanically links the output of actuator 68 to slave link 64, arm 50 of valve door 38, and arm 58 of valve door 40. During operation of cabin OFV assembly 32, actuator 68 selectively moves cabin OFV 34 between partially open (cruise) and closed positions by rotating valve doors 38, 40 about rotational axes, which are parallel to the Y-axis identified by coordinate legend 72 appearing in the lower left corner FIG. 2. As noted above, pressurized air flows from the A/C fuselage, through valve frame 36 and past valve doors 38, 40, and to the ambient environment when cabin OFV 34 is moved into the partially open (cruise) position. Cabin OFV 34 is usefully designed such that pressurized airflow through valve doors 38, 40 occurs in a relatively smooth and quiet manner. In addition, when utilized for thrust recovery, cabin OFV 34 may be designed to encourage the rapid outflow of pressurized air to maximize thrust output. To promote relatively smooth airflow through cabin OFV 34 in the cruise position, a curved bellmouth feature 74 can be provided along the interior edge of valve door 38, as shown. Additionally or alternatively, a row of teeth 76, posts, or similar projections can be provide along the inner edge of valve door 40 to disrupt vortices for noise suppression purposes.

When cabin OFV 34 is moved into the partially open (cruise) position, valve doors 38, 40 may project outwardly from the A/C fuselage to some extent. Valve doors 38, 40 can be produced from an electrically-conductive metallic material, such as aluminum (Al), and are partially exposed from the A/C exterior. Valve doors 38, 40 are consequently susceptible to lightning strike, particularly when OFV 34 is moved into a partially or fully open position. Cabin OFV assembly 32 is produced to include a dedicated, highly conductive lightning strike dissipation path for rapidly delivering lightning energy from valve doors 38, 40 to A/C electrical ground plane 24 (FIG. 1) if and when needed. The provision of such a lightning strike dissipation path thus prevents arcing or other sporadic, localized electrical transfer across valve frame 36, which is fabricated from a dielectric material. In embodiments, valve frame 36 may be produced, in whole or in principal part, from a molded material, such as PEEK or another molded thermoplastic. As indicated above, such thermoplastics can be filled or loaded with additives, such as carbon fibers, to produce composite materials having enhanced proprieties. In this regard, and by way of non-limiting example only, valve frame 36 can be produced from a molded thermoplastic (e.g., PEEK) in embodiments filled with 5% to 30% carbon fibers, by weight percentage. In alternative embodiments, valve frame 36 can be produced from other dielectric materials and may be produced in various other manners, including by machining a (e.g., ceramic) blank or utilizing an additive-manufacturing technique, such as three-dimensional printing.

With continued reference to FIG. 2, the above-described lightning strike dissipation path extends through electrically-conductive coating 42 (again, represented by dot stippling) and to mounting hardware 44. Additionally, the lightning strike dissipation path is further provided by two flexible grounding straps or straps 78, 80 in the illustrated example. Grounding strap 78 extends from a cable attachment point 82 on valve door 38 to nearby cable attachment points 84 provided on valve frame 36. Similarly, grounding strap 78 extends from a cable attachment point 86 on valve door 38 to cable attachment points 88 provided on valve frame 36. In other embodiments, cabin OFV 34 may include a different number of grounding straps or a different type of electrical interconnection may be provided from valve doors 38, 40 to electrically-conductive coating 42.

Electrically-conductive coating 42 extends from cable attachment points 84, 86 to the mount interface of valve frame 36; that is, the fastener openings provided through peripheral flange 46 in the example of FIG. 2. When inserted into the fastener openings provided in flange 46 to attach valve frame 36 to A/C fuselage 22 (FIG. 1), the various mounting devices included in mounting hardware 44 contact electrically-conductive coating 42. In this manner, mounting hardware 44 provides multiple electrically-conductive paths to conduct electrical current from electrically-conductive coating 42 to A/C electrical ground plane 24 (FIG. 1) in a distributed manner, as further discussed below in conjunction with FIG. 5. Grounding straps 78, 80 thus cooperate with electrically-conductive coating 42 and mounting hardware 44 to provide a lightning dissipation path (or paths) through the aforelisted components and extending from valve doors 38, 40 to A/C electrical ground plane 24 (FIG. 1). Additionally, the flexibility of grounding straps 78, 80 permits valve doors 38, 40 to rotate freely between closed and open positions, as previously described.

Figure 3:
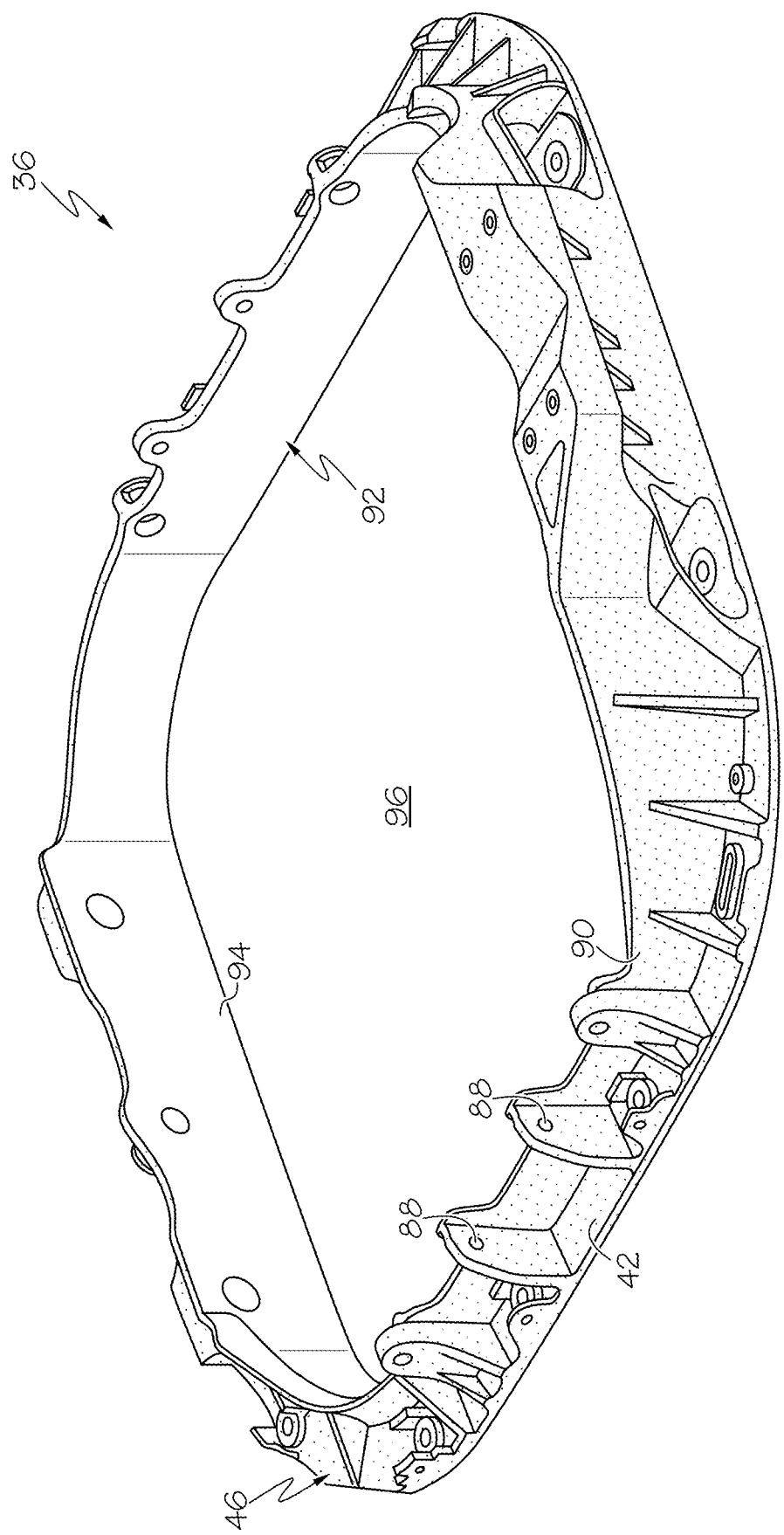
FIGS. 3 and 4 are top and bottom isometric views, respectively, of a valve frame included in the exemplary cabin OFV shown in FIG. 2 and having surfaces over which an electrically-conductive coating is selectively formed.
Figure 4:
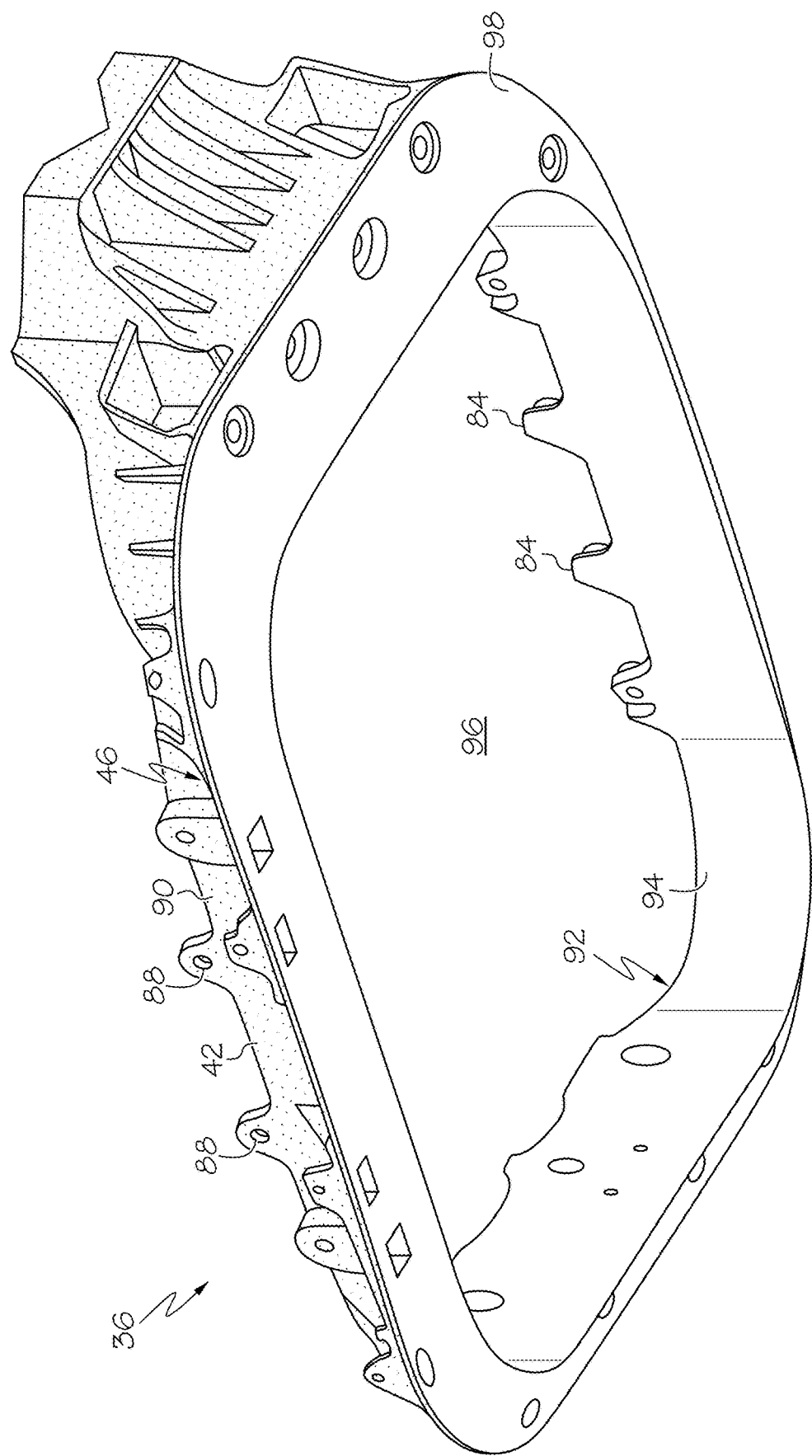

Electrically-conductive coating 42 can be formed over all exterior surfaces of valve frame 36 and, thus, may fully encapsulate frame 36 in embodiments. Alternatively, electrically-conductive coating 42 can be applied to selected regions of valve frame 36 to preserve flexibility of frame 36, for cost savings, or for other reasons. This may be appreciated by referring to FIGS. 3 and 4, which are top and bottom isometric views of valve frame 36, respectively. As indicated in FIGS. 2-3 by dot stippling, electrically-conductive coating 42 is formed over certain selected surfaces of valve frame 36, but not all surfaces of frame 36 in the illustrated example. Specifically, electrically-conductive coating 42 is formed over an outer peripheral surface or sidewall 90 of annular frame body 92 of valve frame 36; noting, herein, the term "annular" encompasses all ring shapes including those having rectangular or square planform geometries. Electrically-conductive coating 42 is likewise formed over the upper or inboard principal surface of peripheral flange 42; that is, the surface of flange 42 closest to valve actuator 68 (FIG. 2) and facing toward the longitudinal axis of the A/C when OFV 34 is installed thereon. Electrically-conductive coating 42 extends from cable attachment points 84, 88 to at least one, preferably a majority, and more preferably to all fastener openings provided through peripheral flange 42. This allows electrical current delivered by lightning strike to flow efficiently and in a distributed manner from cable attachment points 84, 88, through all or substantially all of the coupling fasteners contained in mounting hardware 44 (described below), and to A/C electrical ground plane 24.

In the illustrated example, electrically-conductive coating 42 is not formed over, but rather terminates adjacent inner peripheral surface or sidewall 94 of annular frame body 92 of valve frame 36, which defines central opening 96 through frame 36. Similarly, electrically-conductive coating 42 is not formed over lower or outboard principal surface 98 of annular frame body 92 and peripheral flange 46. This allows the flexibility of valve frame 36 to be better preserved, which may be useful in embodiments in which frame 36 may flex in conjunction with deflection of A/C fuselage 22 (FIG. 1). The amount of valve frame 36 covered or overlaid by electrically-conductive coating 42 will vary among embodiments; however, by way of non-limiting example, in an embodiment in which frame 36 has a cumulative external surface area of $SA_{TOTAL}$, electrically-conductive coating 42 may cover greater than 10% and less than 90% of $SA_{TOTAL}$. In other embodiments, electrically-conductive coating 42 may be formed over other selected surfaces of valve frame 36 or may entirely encapsulate frame 36. Additionally, while electrically-conductive coating 42 is illustrated as a continuous or unbroken coating in the illustrated example, coating 42 can be provided as a discontinuous coating in further embodiments; e.g., coating 42 can be deposited in a checkered pattern or other repeating geometric pattern to, for example, promote flexibility of frame 36 or to provide cost savings.

Figure 5:
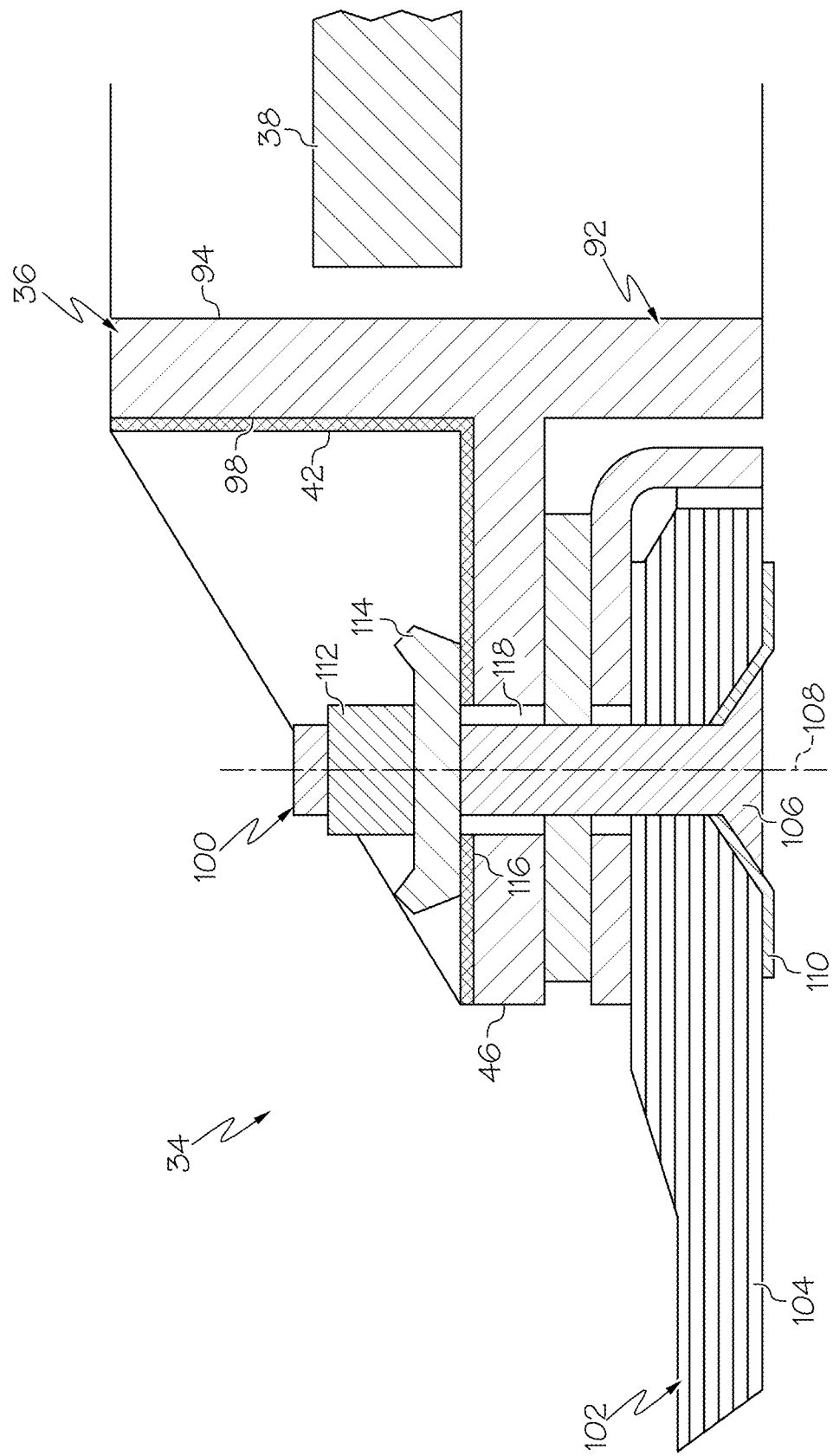
FIG. 5 is a cross-sectional view of a portion of the valve frame shown in FIGS. 2-4, a mounting device, and an A/C fuselage containing an A/C electrical ground plane, as further illustrated in accordance with an exemplary embodiment of the present disclosure.

Advancing to FIG. 5, there is shown a cross-sectional view taken through a limited region of OFV 34 and a mounting device 100 included in mounting hardware 44. A portion of an A/C fuselage 102, which may correspond to A/C fuselage 22 (FIG. 1), is also depicted and contains an A/C electrical ground plane 104; e.g., in the form of a Cu mesh or weave embedded within fuselage 22 as, for example, laminated layers. Here, it can again be seen that electrically-conductive coating layer 42 is formed over outer peripheral sidewall 98 of annular frame body 92, as well as the upper or outboard surface of peripheral flange 46. Mounting device 100 includes a threaded fastener 106 having a countersunk head 108, a conical or dimpled washer 110 engaged by head 108, a nut 112 tightened onto the threaded end of fastener 106, and a nut plate 114 captured between fastener 106 and flange 46. At least fastener 106, dimpled washer 110, and nut plate 114 are composed of electrically-conductive materials; e.g., by way of example, fastener 104 may be composed of titanium (Ti), while washer 110 and nut plate 114 may be composed of steel. Nut plate 114 contacts a seat region 116, which is provided on peripheral flange 46 and extends around a fastener opening 118 through which fastener 104 extends. Seat region 116 is overlaid by electrically-conductive coating 42 such that nut plate 114 is pressed against coating 42 and seat region 116 when nut 112 is tightened onto fastener 106. A secure mechanical connection is thus created allowing electrical conduction from electrically-conductive coating 42, through nut plate 114, through fastener 106, through washer 110, and to Cu mesh layers making-up A/C electrical ground plane 104.

As noted above, electrically-conductive coating 42 can contain any number of layers and have any composition providing that coating 42 adheres to valve frame 36 and possesses adequate electrical conductivity for delivering lightning energy to mounting hardware 44 when needed. In this regard, electrically-conductive coating 42 may be composed of a single electrically-conductive coating layer or, instead, may contain multiple layers forming a coating system. For example, in various embodiments, electrically-conductive coating 42 may contain at least: (i) a first coating layer having a first electrical conductivity, and (ii) a second coating layer formed over the first coating layer and having a second electrical conductive less than the first electrical conductivity. The first coating layer may be predominately composed of Cu, by weight, while the second coating layer may be predominately composed of nickel (Ni) and cobalt (Co), by weight. Further, in embodiments in which valve frame 36 is composed of thermoplastic material (e.g., PEEK) in which carbon fibers are embedded, as previously described, electrically-conductive coating 42 may include a base coating layer (e.g., an electroless nickel strike layer) deposited directly onto valve frame 36 and surrounding portions of the carbon fibers exposed at an outer surface of valve frame 36. A further example of such a coating, as reduced to practice, will now be described in conjunction with FIG. 6.

Figure 6:
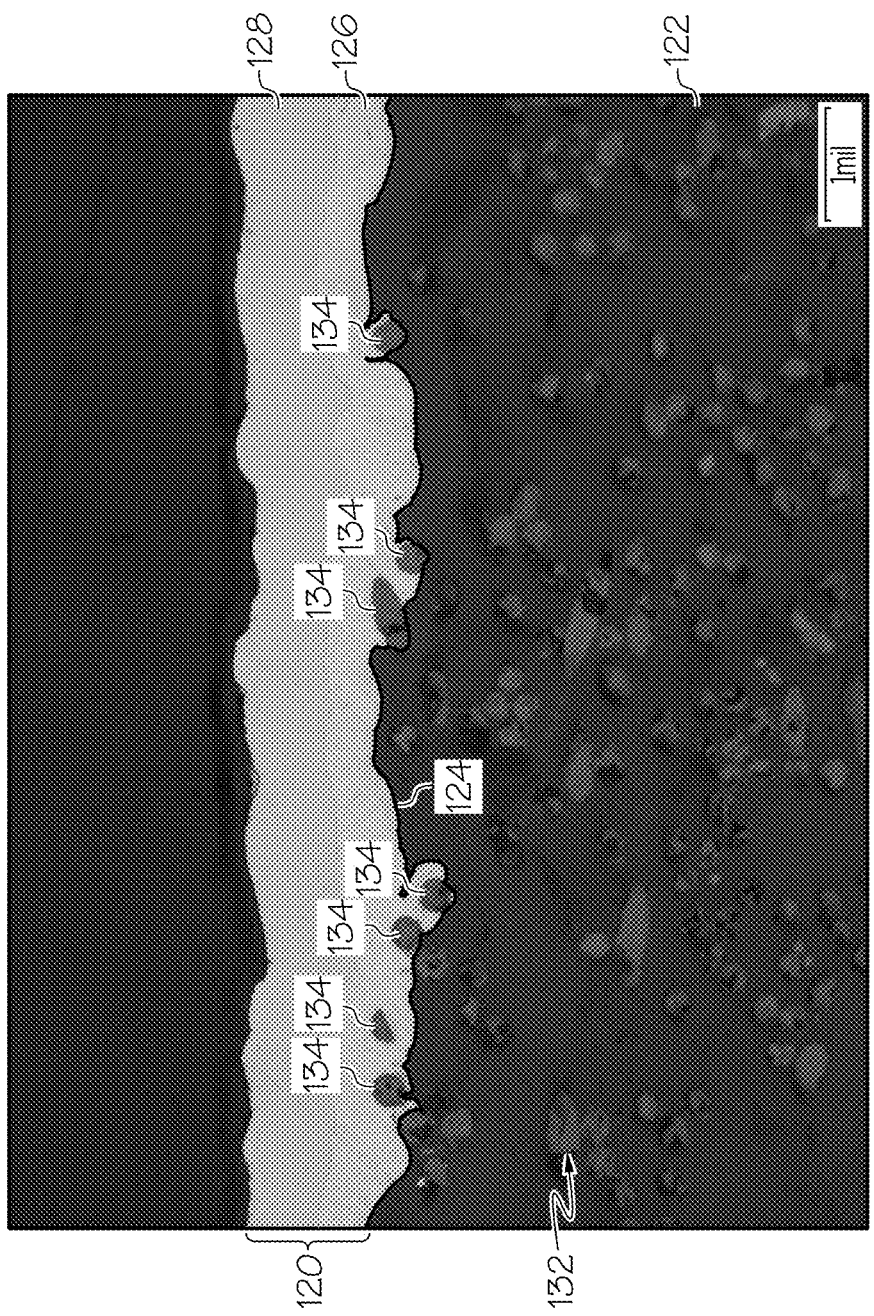
FIG. 6 is a metallographic cross-section micrograph of an electrically-conductive coating, which may be formed over selected surfaces of the valve frame shown in FIGS. 2-5 or another base dielectric component, as depicted in accordance with an exemplary embodiment of the present disclosure and reduced to practice.

FIG. 6 is a metallographic cross-section micrograph of an electrically-conductive coating 120 depicted in accordance with an exemplary embodiment of the present disclosure, which was reduced to practice. Electrically-conductive coating 120 may be formed over selected surfaces of a base dielectric component 122, as previously described; and, therefore, represents one possible implementation of electrically-conductive coating 18 shown in FIG. 1 and electrically-conductive coating 42 shown in FIGS. 2-5. In this particular example, electrically-conductive coating 120 includes three coating layers: (i) a very thin base or bond coat layer 124, (ii) an electrical conduit layer 126, and (iii) a protective top coat layer 128. Due to its relative thinness as compared to layers 126, 128, bond coat layer 124 is difficult to see in FIG. 6 and is thus generally represented by a thickened line for illustrative clarity. Layers 124, 126, 128 are each described, in turn, below. The following notwithstanding, it will be appreciated that alternative embodiments of electrically-conductive coating 120 can include a greater or lesser number of coating layers, which may vary in formulation and purpose depending upon, for example, the particular environment in which electrically-conductive coating 120 is intended to operate and the composition of the surfaces or substrate over which coating 120 is formed.

Bond coat layer 124 may be an electroless metal (e.g., Ni) strike layer in embodiments. In such embodiments, bond coat layer 124 can be formed to be relatively thin, as noted above; e.g., layer 124 may have an average thickness of less than 10 microns (μm) in embodiments. As can be seen in FIG. 6, bond coat layer 124 may be deposited directly onto and, therefore, formed in intimate contact with an outer principal surface of base dielectric component 122. Electrical conduit layer 126 can be composed of any material capable of forming a relatively robust mechanical bond with bond coat layer 124, while having an electrical conductivity substantially equivalent to or higher than that of bond coat layer 124. In various embodiments, electrical conduit layer 126 may be composed of a metal (e.g., Cu) strike layer having a thickness greater than that of bond coat layer 124; e.g., a thickness ranging from about 5 to about 50 μm and, perhaps, from about 10 to 20 μm. In other embodiments, electrical conduit layer 126 may have a thickness greater than or less than the aforementioned range, or layer 124 may be composed of a disparate electrically-conductive material.

Finally, protective top coat layer 128 can be composed of any material providing thermal barrier protection, environment barrier protection, or the like. In one embodiment, top coat layer 128 is composed of a nickel-cobalt (NiCo) alloy formulated to provide galvanic corrosion resistance. Additionally, the NiCo alloy can be imparted with nanocrystalline morphology having an extremely fine grain size for high yield strength and hardness. In such embodiments, top coat layer 128 may be deposited over electrical conduit layer 126 by, for example, electroplating. Top coat layer 128 may have a thickness ranging from about 10 to about 50 μm in embodiments. In other implementations, top coat layer 128 may be thicker or thinner than the aforementioned range; or electrically-conductive coating 120 may lack top coat layer 128 altogether.

In the illustrated example, fibers 132 (e.g., carbon fibers) are distributed through base dielectric component 122. Further, portions or segments 134 of fibers 132 project from and (as considered prior to formation of electrical conduit layer 126) are exposed at an outer principal surface of base dielectric component 122. Some of fibers 132 project outwardly from or are exposed at the surface of base dielectric component 122 such that electrical conduit layer 126, upon deposition, surrounds and envelops exposed portions 134 of fibers 132. So too may bond coat layer 124 contact regions of the exposed fibers 132. A mechanical locking effect consequently occurs resulting in a highly robust mechanical bond. The likelihood of delamination or separation of electrically-conductive coating and, particularly, electrical conduit layer 126 from base dielectric component 122 is thus greatly reduced, even when component 122 is subject to deflection; e.g., as described above, when assuming the form of valve frame 36 (FIGS. 2-5), base dielectric component 122 may flex in conjunction with deflection of an A/C fuselage on which cabin OFV 34 (FIGS. 2 and 5) is installed.

Testing has demonstrated that electrically-conductive coating 120 is highly resistant to delamination from base dielectric component 122 due, in large part, to the embedment of exposed portions 134 of carbon fiber 132 in electrical conduit layer 126; that is, due to the manner in which electrical conduit layer 126 contacts and surrounds exposed portions 134 of carbon fiber 132. Additionally, electrically-conductive coating 120 provides robust electrical conduction for dissipation of lightning energy over and across base dielectric component 122 (e.g., valve frame 36 shown in FIGS. 2-5) due, principally, to the provision of electrical conduit layer 126. Finally, electrically-conductive coating 120 is resistive to galvanic corrosion (particularly, within electrical conduit layer 126 when composed of Cu) and other modes of environmental degradation due, at least in principal part, to protective top coat layer 128. Further, top coat layer 128 may also contribute added electrically conductive to coating 120. Electrically-conductive coating 120 is thus well-suited for usage as coating 42 shown in FIGS. 2-5 or, more generally, as coating 18 shown in FIG. 1.

CONCLUSION

The foregoing has thus provided of lightning-dissipative A/C assemblies, as well as valve frames coated with specialized, electrically-conductive coatings. Embodiments of the lightning-dissipative A/C assembly can be implemented as various different types of A/C assemblies, which contain at least one metallic component exposed from the A/C exterior and susceptible to lightning strike from the surrounding ambient environment. In various embodiments, the lightning-dissipative A/C assembly may assume the form of an airborne valve assembly, such as a cabin OFV, exposed from the A/C exterior. In such embodiments, the valve assembly may include a strike-susceptible metallic component in the form of a valve door composed of Al or another metallic material. The valve door may be pivotally mounted to a base dielectric component in the form of a valve frame, which is composed of a dielectric material. More specifically, the valve frame may be composed of molded PEEK or another thermoplastic, which may or may not contain fillers (e.g., carbon fibers), in at least some implementations. An electrically-conductive coating may be formed on selected surfaces of the valve frame to help complete a lightning strike-dissipation path, which extends from the valve door to an A/C ground plane when the OFV is installed on an A/C. The lightning strike dissipation path may also extend through other components, such as one or more grounding straps and mounting hardware, further included in the A/C assembly in embodiments.

Terms such as "comprise," "include," "have," and variations thereof are utilized herein to denote non-exclusive inclusions. Such terms may thus be utilized in describing processes, articles, apparatuses, and the like that include one or more named steps or elements, but may further include additional unnamed steps or elements. The terms "first," "second," and the like are utilized herein to denote order of introduction during the course of description and may thus vary from the foregoing Detailed Description to the appended Claims to reflect changes in order of introduction.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A lightning-dissipative aircraft (A/C) assembly configured to be installed on an A/C including an A/C electrical ground plane, the lightning-dissipative A/C assembly comprising:

a base dielectric component;
a strike-susceptible metallic component coupled to the base dielectric component;
an electrically-conductive coating formed on one or more surfaces of the base dielectric component, the electrically-conductive coating comprising a first coating layer and a second coating layer, the first coating layer having a first electrical conductivity, the second coating layer formed over the first coating layer and having a second electrical conductivity that is less than the first electrical conductivity; and
a lightning strike dissipation path extending from the strike-susceptible metallic component, through the electrically-conductive coating, and to the A/C electrical ground plane when the lightning-dissipative A/C assembly is installed on the A/C,
wherein the strike-susceptible metallic component comprises a valve door composed of a metallic material, and wherein the base dielectric component comprises a valve frame to which the valve door is movably mounted.

2. The lightning-dissipative A/C assembly of claim 1 wherein the base dielectric component comprises a mount interface, and wherein the lightning-dissipative A/C assembly further comprises a mounting hardware configured to engage the mount interface to attach the base dielectric component to the A/C.

3. The lightning-dissipative A/C assembly of claim 1 wherein the valve frame comprises:
an inner peripheral region defining a central opening in which the valve door is mounted; and
an outer peripheral region extending around the inner peripheral region;
wherein at least a majority of the outer peripheral region is covered by the electrically-conductive coating, while at least a majority of the inner peripheral region is uncovered by the electrically-conductive coating.

4. The lightning-dissipative A/C assembly of claim 1 further comprising a grounding strap coupled between the valve door and the valve frame, the lightning strike dissipation path further extending through the flexible grounding strap.

5. The lightning-dissipative A/C assembly of claim 4 wherein the grounding strap extends from the valve door to at least one strap attachment point on the valve frame; and
wherein the at least one strap attachment is electrically coupled to the mount interface through the electrically-conductive coating.

6. The lightning-dissipative A/C assembly of claim 1 wherein the base dielectric component comprises:
a valve frame having a peripheral flange; and
a plurality of fastener openings spaced around the peripheral flange and located adjacent the electrically-conductive coating.

7. The lightning-dissipative A/C assembly of claim 6 further comprising:
a plurality of electrically-conductive fasteners received through the plurality of fastener openings; and
a plurality of electrically-conductive clamp members pressed against seat regions of the flange by the plurality of electrically-conductive fasteners when the lightning-dissipative A/C assembly is installed on the A/C.

8. The lightning-dissipative A/C assembly of claim 7 wherein the electrically-conductive coating extends over the seat regions of the peripheral flange.

9. The lightning-dissipative A/C assembly of claim 1 wherein the first coating layer is predominately composed of copper, by weight; and wherein the second coating layer is predominately composed of nickel and cobalt, by weight.

10. The lightning-dissipative A/C assembly of claim 1 wherein the base dielectric component is composed of thermoplastic material in which carbon fibers are embedded.

11. The lightning-dissipative A/C assembly of claim 10 wherein the electrically-conductive coating comprises an electrical conduit layer surrounding portions of the carbon fibers exposed at an outer surface of the base dielectric component.

12. The lightning-dissipative A/C assembly of claim 11 wherein the electrically-conductive coating further comprises an electroless nickel strike layer deposited directly onto the base dielectric component and underlying the electrical conduit layer.

13. A lightning-dissipative aircraft (A/C) assembly configured to be installed on an A/C utilizing mounting hardware, the lightning-dissipative A/C assembly comprising:
- a valve frame at least predominately composed of a dielectric material by weight;
- an electrically-conductive coating formed on one or more surfaces of the valve frame; and
- a valve door movably coupled to the valve frame and at least predominately composed of an electrically-conductive material by weight, the valve door electrically coupled to the mounting hardware through the electrically-conductive coating when the lightning-dissipative A/C assembly is installed on an A/C.

14. The lightning-dissipative A/C assembly of claim 13 wherein the valve frame comprises:
- a majority molded thermoplastic by weight; and
- fibers distributed through the valve frame and exposed at outer surfaces thereof;
- wherein the electrically-conductive coating contacts and surrounds portions of the fiber exposed at the outer surfaces of the valve frame.

15. The lightning-dissipative A/C assembly of claim 13 wherein the valve frame has a cumulative external surface area of $SA_{TOTAL}$, wherein the electrically-conductive coating covers greater than 10% and less than 90% of $SA_{TOTAL}$.

16. The lightning-dissipative A/C assembly 13 further comprising a grounding strap extending from the valve door to a cable attachment point provided on the valve frame, the electrically-conductive coating formed over the cable attachment point.

17. The lightning-dissipative A/C assembly 13 wherein the valve frame comprises a peripheral flange having a mount interface engaged by the mounting hardware, the electrically-conductive coating extending from the cable attachment point to the mount interface to electrically couple the grounding strap to the mounting hardware when the lightning-dissipative A/C assembly is installed on an A/C.

18. A valve frame utilized in conjunction with a grounding strap and mounting hardware, the valve frame comprising:
- an annular frame body through which a central opening is provided;
- a cable attachment point provided on the annular frame body to which the grounding strap attaches;
- a peripheral flange extending around the annular frame body and having a mounting interface engaged by the mounting hardware to attach the valve frame to an aircraft; and
- an electrically-conductive coating formed on the annular frame body and the peripheral flange;
- wherein the annular frame body and the peripheral flange are predominately composed of a dielectric material, by weight; and
- wherein the electrically-conductive coating extends from the cable attachment point to the mount interface to eclectically connect the grounding strap to the mounting hardware when the valve frame is attached to the aircraft.

* * * * *